(12) United States Patent
Przybylski

(10) Patent No.: US 8,452,274 B2
(45) Date of Patent: May 28, 2013

(54) GLOBAL AUTOMATIC CELLULAR PROVISIONING

(75) Inventor: Matthew G. Przybylski, Gand Blanc, MI (US)

(73) Assignee: General Motors LLC, Detroit, MI (US)

( * ) Notice: Subject to any disclaimer, the term of this patent is extended or adjusted under 35 U.S.C. 154(b) by 0 days.

(21) Appl. No.: 13/016,178

(22) Filed: Jan. 28, 2011

(65) Prior Publication Data

US 2012/0196585 A1    Aug. 2, 2012

(51) Int. Cl.
*H04M 3/00*    (2006.01)

(52) U.S. Cl.
USPC .......................................................... 455/419

(58) Field of Classification Search
USPC .................................................. 455/418, 419
See application file for complete search history.

(56) References Cited

U.S. PATENT DOCUMENTS 7,894,795 B1 *   2/2011   Dunne et al. .................. 455/406
2010/0203864 A1 *   8/2010   Howard ........................ 455/411

* cited by examiner

*Primary Examiner* — Temica M Beamer
*Assistant Examiner* — Joel Ajayi
(74) *Attorney, Agent, or Firm* — Leydig, Voit & Mayer, Ltd.

(57) ABSTRACT

The described method and system provide for the provisioning of a telematics unit on a telematics-equipped vehicle with cellular service information without pre-loading the information during manufacture of the vehicle or telematics unit. A telematics unit may be manufactured without cellular service information (e.g. MIN, MDN, carrier information) pre-loaded. At the vehicle assembly plant where the telematics unit is installed on a vehicle, the assembly plant's programming system may determine the final country destination for the vehicle and program the destination of the vehicle into the telematics unit. The assembly plant may further obtain vehicle attribute data (including a cellular identifier for the telematics unit) and send the data to a TSP. The TSP may then work with the wireless carrier in the destination country to assign the telematics unit a phone number and other cellular service information. After the telematics unit has determined that the vehicle is at the destination, the telematics unit may connect to a network using cellular commands to request an "over-the-air" cellular programming session. The wireless carrier may then push a phone number and other cellular service information into the telematics unit through the over-the-air cellular programming session.

10 Claims, 4 Drawing Sheets

GLOBAL AUTOMATIC CELLULAR PROVISIONING

BACKGROUND OF THE INVENTION

Telematics units within mobile vehicles provide subscribers with connectivity to a telematics service provider (TSP). The TSP may provide the subscriber with an array of services ranging from emergency call handling and stolen vehicle recovery to diagnostics monitoring and turn-by-turn navigation. Telematics units are often provisioned and activated at a point of sale when a subscriber purchases a telematics-equipped vehicle. Upon activation, the telematics unit can be utilized to provide a subscriber with the telematics services.

Conventionally, telematics units pre-loaded with cellular service information are sent to vehicle assembly plants. The cellular service information may include a MIN (Mobile Identification Number), a MDN (Mobile Directory Number), or other carrier information. The vehicle assembly plant then assembles each vehicle, equipping the vehicle with the telematics unit, and ships the telematics-equipped vehicles to their predetermined destinations, which may be widely dispersed, perhaps even in several different countries.

Because the telematics units are conventionally pre-loaded with cellular service information, a part number based on the destination country or phone number has to be assigned to each telematics unit so that telematics unit is assured of being pre-loaded with cellular service information corresponding to the particular location (e.g., country, etc.) where the host vehicle is to be shipped. Furthermore, the manufacturer of the telematics unit (which may or may not be the same manufacturer as the manufacturer of the vehicle) is required to work with a wireless carrier and manage the programming of phone numbers and other information into each telematics unit. Additionally, errors may occur at the vehicle assembly plant such that a vehicle shipped to one country is mistakenly installed with a telematics unit configured with information for another country.

Thus, it is an object in part to provide a system and method for provisioning a telematics unit with cellular service information without pre-loading the telematics unit with the information during the manufacturing process to reduce manufacturing costs. However, while this is an object underlying certain implementations of the invention, it will be appreciated that the invention is not limited to systems that solve the problems noted herein. Moreover, the inventors have created the above body of information for the convenience of the reader and expressly disclaim all of the foregoing as prior art; the foregoing is a discussion of problems discovered and/or appreciated by the inventors, and is not an attempt to review or catalog the prior art.

BRIEF SUMMARY OF THE INVENTION

The invention provides a system and method for provisioning a telematics unit with cellular service information without pre-loading the information during vehicle manufacture. A telematics unit may be manufactured and shipped to a vehicle assembly plant without cellular service information (e.g. phone number, MIN, MDN, other carrier information related to cellular services that may be provided through the telematics unit by a carrier) pre-loaded. At the vehicle assembly plant, the telematics unit may be installed into a vehicle. The assembly plant's programming system may determine the final country destination for the vehicle, and may program a set of GPS coordinates into the telematics unit that define the destination country. For example, the assembly plant programming system may contain a database of GPS coordinates that define an outline for each country, and may program the set of GPS coordinates defining the outline of a vehicle's destination country into the vehicle.

Additionally, the assembly plant may pull a unique cellular identifier from the telematics unit and add the unique cellular identifier to the assembly plant's record of vehicle attribute data. The vehicle attribute data may include the VIN (Vehicle Identification Number), destination country code, content, etc. The unique cellular identifier may be a number such as a IMEI (International Mobile Equipment Identity) or MEID (Mobile Equipment Identifier) or ESN (Electronic Serial Number) which is uniquely associated with the cellular component of the telematics unit. As vehicle assembly is completed and approved for shipment, the assembly plant may then send the vehicle attribute data including the unique cellular identifiers to a TSP call center. The TSP may then work with the wireless carrier in the destination country to assign the telematics unit a phone number and other cellular service information (e.g. MIN, MDN, or other carrier information). The wireless carrier may then store this information on the network.

After the vehicle has left the assembly plant, the telematics unit may determine when the vehicle has arrived at the destination country. For example, the telematics unit may compare the GPS coordinates of the current location of the vehicle to the pre-loaded GPS coordinates of the destination country's borders each time the telematics unit is turned on to determine whether the vehicle is inside the destination country's borders. When the telematics unit has determined that the vehicle is within the destination country, the telematics unit may connect to the network using cellular commands to request an "over-the-air" cellular programming session. The wireless carrier may then push a phone number and other cellular service information into the telematics unit through the over-the-air cellular programming session. The telematics unit may then load this information into its permanent memory, which results in the telematics unit being fully provisioned for cellular service.

Other objects and advantages of the invention will become apparent upon reading the following detailed description and upon reference to the drawings.

DETAILED DESCRIPTION OF THE INVENTION

Before discussing the details of the invention and the environment wherein the invention may be used, a brief overview is given to guide the reader. In general terms, not intended to limit the claims, the invention is directed to a system and method for provisioning a telematics unit with cellular service information without pre-loading the information during manufacture of the vehicle or telematics unit. A telematics unit may be manufactured without cellular service information (e.g. MIN, MDN, carrier information) pre-loaded. At the vehicle assembly plant where the telematics unit is installed (i.e. equipped) on a vehicle, the assembly plant's programming system may determine the final country destination for the vehicle and program the destination of the vehicle into the telematics unit. The assembly plant may further obtain vehicle attribute data (including a cellular identifier for the telematics unit) and send the data to a TSP. The TSP may then work with the wireless carrier in the destination country or area to assign the telematics unit a phone number and other cellular service information (e.g. an MIN, MDN, or other carrier information). After the telematics unit has determined that the vehicle is within the destination country or area, the telematics unit may connect to a network using cellular commands to request an "over-the-air" cellular programming session. The wireless carrier may then push a phone number and other cellular service information into the telematics unit through the over-the-air cellular programming session.

Figure 1:
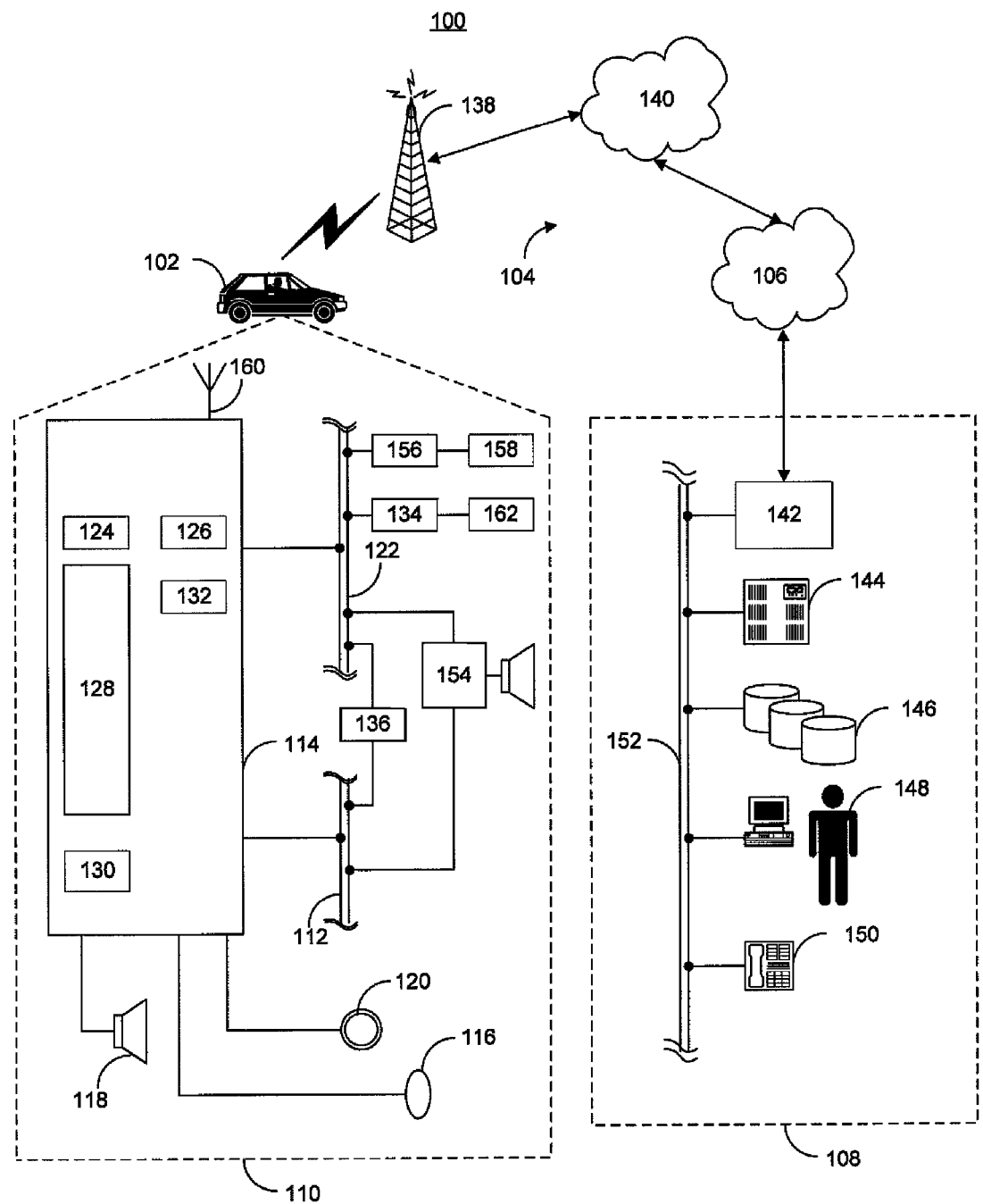
FIG. 1 is a schematic diagram of an operating environment for a mobile vehicle communication system usable in implementations of the described principles.

Given this overview, an exemplary environment in which the invention may operate is described hereinafter. It will be appreciated that the described environment is an example, and does not imply any limitation regarding the use of other environments to practice the invention. With reference to FIG. 1 there is shown an example of a communication system 100 that may be used with the present method and system and generally includes a vehicle 102, a wireless carrier system 104, a land network 106 and a call center 108. It should be appreciated that the overall architecture, setup and operation, as well as the individual components of a system such as that shown here are generally known in the art. Thus, the following paragraphs simply provide a brief overview of one such exemplary information system 100; however, other systems not shown here could employ the present method as well.

Vehicle 102 is preferably a mobile vehicle such as a motorcycle, car, truck, recreational vehicle (RV), boat, plane, etc., and is equipped with suitable hardware and software that enables it to communicate over system 100. Some of the vehicle hardware 110 is shown generally in FIG. 1 including a telematics unit 114, a microphone 116, a speaker 118 and buttons and/or controls 120 connected to the telematics unit 114. Operatively coupled to the telematics unit 114 is a network connection or vehicle bus 122. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few.

The telematics unit 114 is an onboard device that provides a variety of services through its communication with the call center 108, and generally includes an electronic processing device 128 one or more types of electronic memory 130, a cellular chipset/component 124, a wireless modem 126, a dual antenna 160 and a navigation unit containing a GPS chipset/component 132. In one example, the wireless modem 126 is comprised of a computer program and/or set of software routines executing within processing device 128. The cellular chipset/component 124 and the wireless modem 126 may be called the network access device (NAD) of the telematics unit 114.

The telematics unit 114 provides too many services to list them all, but several examples include: turn-by-turn directions and other navigation-related services provided in conjunction with the GPS based chipset/component 132; airbag deployment notification and other emergency or roadside assistance-related services provided in connection with various crash and or collision sensor interface modules 156 and sensors 158 located throughout the vehicle. Infotainment-related services where music, Web pages, movies, television programs, video games and/or other content is downloaded by an infotainment center 136 operatively connected to the telematics unit 114 via vehicle bus 122 and audio bus 112. In one example, downloaded content is stored for current or later playback.

Again, the above-listed services are by no means an exhaustive list of all the capabilities of telematics unit 114, as should be appreciated by those skilled in the art, but are simply an illustration of some of the services that the telematics unit 114 is capable of offering. It is anticipated that telematics unit 114 include a number of known components in addition to those listed above.

Vehicle communications preferably use radio transmissions to establish a voice channel with wireless carrier system 104 so that both voice and data transmissions can be sent and received over the voice channel. Vehicle communications are enabled via the cellular chipset/component 124 for voice communications and a wireless modem 126 for data transmission. In order to enable successful data transmission over the voice channel, wireless modem 126 applies some type of encoding or modulation to convert the digital data so that it can communicate through a vocoder or speech codec incorporated in the cellular chipset/component 124. Any suitable encoding or modulation technique that provides an acceptable data rate and bit error can be used with the present method. Dual mode antenna 160 services the GPS chipset/component and the cellular chipset/component.

Microphone 116 provides the driver or other vehicle occupant with a means for inputting verbal or other auditory commands, and can be equipped with an embedded voice processing unit utilizing a human/machine interface (HMI) technology known in the art. Conversely, speaker 118 provides verbal output to the vehicle occupants and can be either a stand-alone speaker specifically dedicated for use with the telematics unit 114 or can be part of a vehicle audio component 154. In either event, microphone 116 and speaker 118 enable vehicle hardware 110 and call center 108 to communicate with the occupants through audible speech. The vehicle hardware also includes one or more buttons or controls 120 for enabling a vehicle occupant to activate or engage one or more of the vehicle hardware components 110. For example, one of the buttons 120 can be an electronic push button used to initiate voice communication with call center 108 (whether it be a live advisor 148 or an automated call response system). In another example, one of the buttons 120 can be used to initiate emergency services.

The audio component 154 is operatively connected to the vehicle bus 122 and the audio bus 112. The audio component 154 receives analog information, rendering it as sound, via the audio bus 112. Digital information is received via the vehicle bus 122. The audio component 154 provides AM and FM radio, CD, DVD, and multimedia functionality independent of the infotainment center 136. Audio component 154 may contain a speaker system, or may utilize speaker 118 via arbitration on vehicle bus 122 and/or audio bus 112.

The vehicle crash and/or collision detection sensor interface 156 are operatively connected to the vehicle bus 122. The crash sensors 158 provide information to the telematics unit 114 via the crash and/or collision detection sensor interface 156 regarding the severity of a vehicle collision, such as the angle of impact and the amount of force sustained.

Vehicle sensors 162, connected to various sensor interface modules 134 are operatively connected to the vehicle bus 122. Example vehicle sensors include but are not limited to gyroscopes, accelerometers, magnetometers, emission detection and/or control sensors, and the like. Example sensor interface modules 134 include power train control, climate control, and body control, to name but a few.

Wireless carrier system 104 is preferably a cellular telephone system or any other suitable wireless system that transmits signals between the vehicle hardware 110 and land network 106. According to an example, wireless carrier system 104 includes one or more cell towers 138, base stations and/or mobile switching centers (MSCs) 140, as well as any other networking components required to connect the wireless system 104 with land network 106. A component in the mobile switching center may include a remote data server 144.

As appreciated by those skilled in the art, various cell tower/base station/MSC arrangements are possible and could be used with wireless system 104. For example, a base station and a cell tower could be co-located at the same site or they could be remotely located, and a single base station could be coupled to various cell towers or various base stations could be coupled with a single MSC, to but a few of the possible arrangements. Preferably, a speech codec or vocoder is incorporated in one or more of the base stations, but depending on the particular architecture of the wireless network, it could be incorporated within a Mobile Switching Center or some other network components as well.

Land network 106 can be a conventional land-based telecommunications network that is connected to one or more landline telephones and connects wireless carrier network 104 to call center 108. For example, land network 106 can include a public switched telephone network (PSTN) and/or an Internet protocol (IP) network, as is appreciated by those skilled in the art. Of course, one or more segments of the land network 106 can be implemented in the form of a standard wired network, a fiber or other optical network, a cable network, other wireless networks such as wireless local networks (WLANs) or networks providing broadband wireless access (BWA), or any combination thereof.

Call Center (OCC) 108 is designed to provide the vehicle hardware 110 with a number of different system back-end functions and, according to the example shown here, generally includes one or more switches 142, servers 144, databases 146, live advisors 148, as well as a variety of other telecommunication and computer equipment 150 that is known to those skilled in the art. These various call center components are preferably coupled to one another via a network connection or bus 152, such as the one previously described in connection with the vehicle hardware 110. Switch 142, which can be a private branch exchange (PBX) switch, routes incoming signals so that voice transmissions are usually sent to either the live advisor 148 or an automated response system, and data transmissions are passed on to a modem or other piece of equipment 150 for demodulation and further signal processing.

The modem 150 preferably includes an encoder, as previously explained, and can be connected to various devices such as a server 144 and database 146. For example, database 146 could be designed to store subscriber profile records, subscriber behavioral patterns, or any other pertinent subscriber information. Although the illustrated example has been described as it would be used in conjunction with a manned call center 108, it will be appreciated that the call center 108 can be any central or remote facility, manned or unmanned, mobile or fixed, to or from which it is desirable to exchange voice and data.

Figure 2:
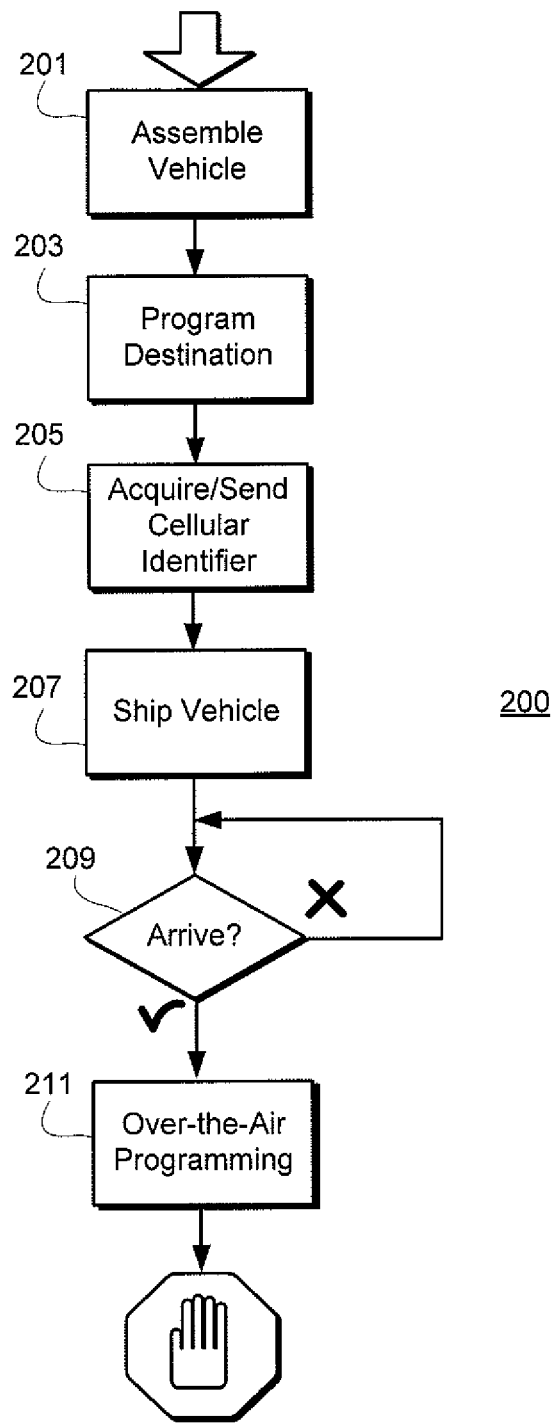
FIG. 2 is a flowchart illustrating a process for provisioning a telematics unit with cellular service information without pre-loading the information during vehicle manufacture in accordance with an implementation of the described principles.

With further reference to the architecture of FIG. 1, and turning more specifically to FIG. 2, a process 200 is depicted by which a telematics-equipped vehicle may be assembled and the telematics unit provisioned without pre-loading the telematics unit with cellular service information. In one implementation, a telematics-equipped vehicle may be assembled 201 at a vehicle assembly plant. The telematics unit that is a part of the telematics-equipped vehicle may be manufactured at the vehicle assembly plant, or it may be manufactured elsewhere and shipped to the vehicle assembly plant. The telematics unit may include a cellular identifier (such as, for example, a IMEI, MEID, or ESN), but the telematics is not pre-loaded with cellular service information, i.e., a phone number, MIN, MDN, or other carrier information. During the vehicle assembly process, the telematics unit is installed or equipped to a vehicle as part of the process of assembling the telematics-equipped vehicle.

During the assembly process (it may happen before or after the telematics unit is installed into the vehicle) or after the assembly process, the vehicle assembly plant may program a destination 203 into the telematics unit. The vehicle assembly plant may further program instructions, along with an appropriate application or applications to carry out those instructions, into the telematics unit for checking whether the telematics-equipped vehicle has arrived at the destination or not, and for initiating an over-the-air programming session with a wireless carrier when the telematics unit determines that the host vehicle has arrived at the destination.

In an alternative implementation, appropriate application or applications and instructions may be pre-loaded into the telematics unit when the telematics unit is manufactured. The destination may be defined as a set of GPS coordinates that the vehicle assembly plant programs into the telematics unit. In a further implementation, the set of GPS coordinates may be the outline of a destination country or area to which the vehicle is to be shipped. The vehicle assembly plant programming system may contain a database of GPS coordinate sets that define the outlines of all potential destination areas or countries. In a further implementation, the vehicle assembly plant may receive destination data from a TSP through communication with a call center.

The vehicle assembly plant may further acquire a cellular identifier (such as, for example, an IMEI, MEID, or ESN) from the telematics unit 205. The vehicle assembly plant, which may keep a record of vehicle attribute data for vehicles assembled at the plant, may further add the cellular identifier to the record of the vehicle attribute data of the vehicle on which the corresponding telematics unit is equipped. The vehicle attribute data of a vehicle may further include the VIN, information relating to the destination area or country for the vehicle (e.g. a country code), and other information about the vehicle.

The vehicle assembly plant may further communicate the vehicle attribute data of the telematics-equipped vehicle to a TSP, for example, by sending the information over a network to the TSP's back office at a TSP call center. When the TSP has the cellular identifier associated with the telematics unit on the telematics-equipped vehicle, the TSP can then work with a wireless carrier that provides cellular service to the destination area or country of the vehicle to assign a phone number or other cellular service information to the telematics unit (e.g. MIN, MDN, other carrier information). The wireless carrier may then load this information into the network.

For example, the wireless carrier may create a record that the telematics unit with a particular cellular identifier has been assigned a particular phone number or other cellular service information and store the record on the network. In a further implementation, the wireless carrier may communicate the assignment information to the TSP, and the TSP may also maintain a record of the assignment.

After the telematics-equipped vehicle is assembled, the vehicle may be shipped 207 and the telematics unit may check whether or not the vehicle has arrived 209 at the destination. The telematics unit may continue to check whether the vehicle has arrived at the destination until the vehicle actually arrives 209. In one implementation, the telematics unit may use the GPS component of the telematics unit to determine the GPS coordinates of the current location of the vehicle and determine whether those coordinates are within the area bounded by the set of GPS coordinates defining the destination area or country. One skilled in the art will appreciate that various algorithms for checking whether the vehicle has arrived may be used.

In a further implementation the telematics unit may compare the GPS coordinates of the current location to the preloaded GPS coordinates of the destination area or country each time the telematics unit is turned on. One skilled in the art will appreciate that various checking intervals may be used as well, such as, for example, "waking" the telematics unit automatically at regular intervals to perform the check, checking sporadically from time to time, or only checking when the vehicle is turned on.

When the telematics unit determines that the vehicle is within the destination area or country, the telematics unit may then connect to a network using cellular commands to initiate or request an "over-the-air" cellular programming session with the wireless carrier 211. "Over-the-air" cellular programming is a capability that may be offered by a wireless carrier to allow provisioning of cellular devices "over the air" (i.e. over the cellular network). Through the over-the-air cellular programming session, the wireless carrier may transmit cellular service information such as a phone number, MIN, MDN or other cellular service information to the telematics unit over a network, preferably the network associated with the wireless carrier.

The telematics unit may further load the information into the memory of the telematics unit (which may occur pursuant to instructions programmed into the telematics unit by the vehicle assembly plant), such that the telematics unit is fully provisioned for cellular service. One skilled in the art will appreciate that a wireless carrier may communicate with a telematics unit over a network through its servers, databases, and other components connected to the network.

Because the telematics unit is not assigned a phone number, MIN, MDN or other cellular service information until the over-the-air cellular programming session in this implementation, the manufacturing process for telematics-equipped vehicles may require fewer steps and may be completed at a lower cost. Since the telematics unit may be manufactured without designating a destination area or country before installing the telematics unit into the vehicle, the likelihood of mistakes at the vehicle assembly plant is reduced, including the likelihood of errors that occur when a telematics unit designated for one country is installed into a vehicle sent to a different country. Furthermore, the manufacturer of the telematics unit is not required to manage the phone numbers and other carrier information to be loaded into the telematics unit or to program cellular service information into the telematics unit, which may reduce the number of manufacturing steps and lower the cost of manufacturing a telematics unit. The cost of assigning a phone number or wireless carrier to a telematics unit may also be reduced, as the number or carrier may be assigned later in the vehicle's life cycle.

One skilled in the art will appreciate that the processes depicted by FIG. 2 need not be carried out in the order depicted and that some processes may be carried out in a different order. For example, the vehicle assembly plant may send 205 the cellular identifier associated with a telematics unit to the TSP after the vehicle has already shipped 207, or the telematics unit may begin checking whether it is in the destination area or country 209 before it leaves the vehicle assembly plant 207.

Figure 3:
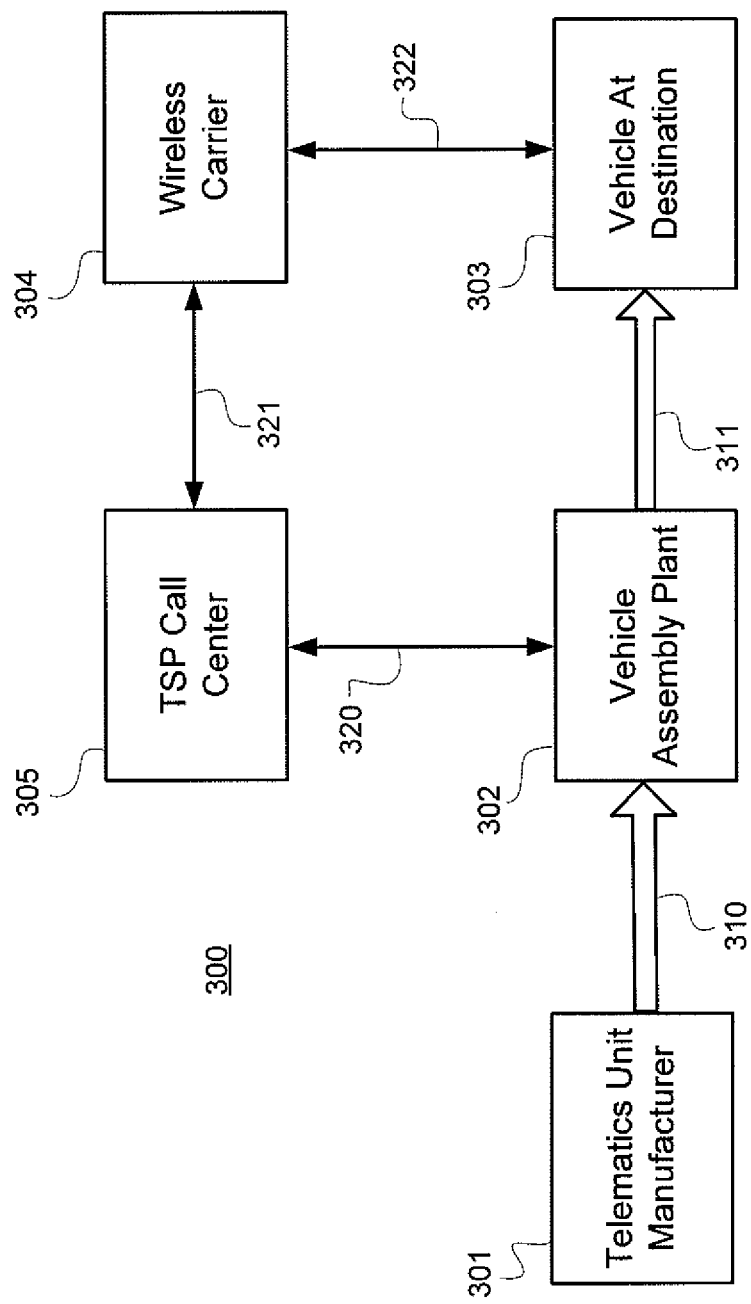
FIG. 3 is a schematic illustrating the role of a telematics unit manufacturer, a vehicle assembly plant, a TSP call center, and a wireless carrier in accordance with an implementation of the described principles.

With further reference to the architecture of FIG. 1 and the process of FIG. 2, and turning more specifically to FIG. 3, a schematic 300 is depicted illustrating the interaction between a telematics unit manufacturer 301, vehicle assembly plant 302, TSP call center 305, wireless carrier 304 and vehicle 303 in one implementation. The telematics unit manufacturer 301 may send 310 a telematics unit to a vehicle assembly plant 302, where the telematics unit is to be installed into a vehicle during the assembly of a telematics-equipped vehicle. One skilled in the art will appreciate that the vehicle assembly plant 302 itself may manufacture telematics units, as described above, in which case the telematics unit manufacturer 301 and the vehicle assembly plant 302 could be the same entity.

The vehicle assembly plant may communicate 320 over a network with a TSP call center 305, for example, receiving information including but not limited to the destinations of the vehicles assembled at the plant and sets of GPS coordinates relating to those destinations, and sending information including but not limited to vehicle attribute data such as a VIN, cellular identifier, and other vehicle information. The TSP call center 305 may further communicate 321 with a wireless carrier 304 over a network, for example, sending information including but not limited to cellular identifiers and the destination of shipped vehicles such that the wireless carrier may assign phone numbers and other cellular service information to the shipped vehicles.

The TSP call center 305 and wireless carrier 304 may further send and receive cellular service information and vehicle information to each other 321 to maintain records regarding the assignment of cellular service information such as phone numbers to telematics-equipped vehicles. The vehicle assembly plant 302 may ship 311 a completed telematics-equipped vehicle to a destination, and when the telematics unit determines that the vehicle has arrived at the destination, the vehicle 303, via the telematics unit, may communicate 322 with the wireless carrier 304 over a cellular network to provision the telematics unit with cellular service information as described above with respect to FIG. 2.

Figure 4:
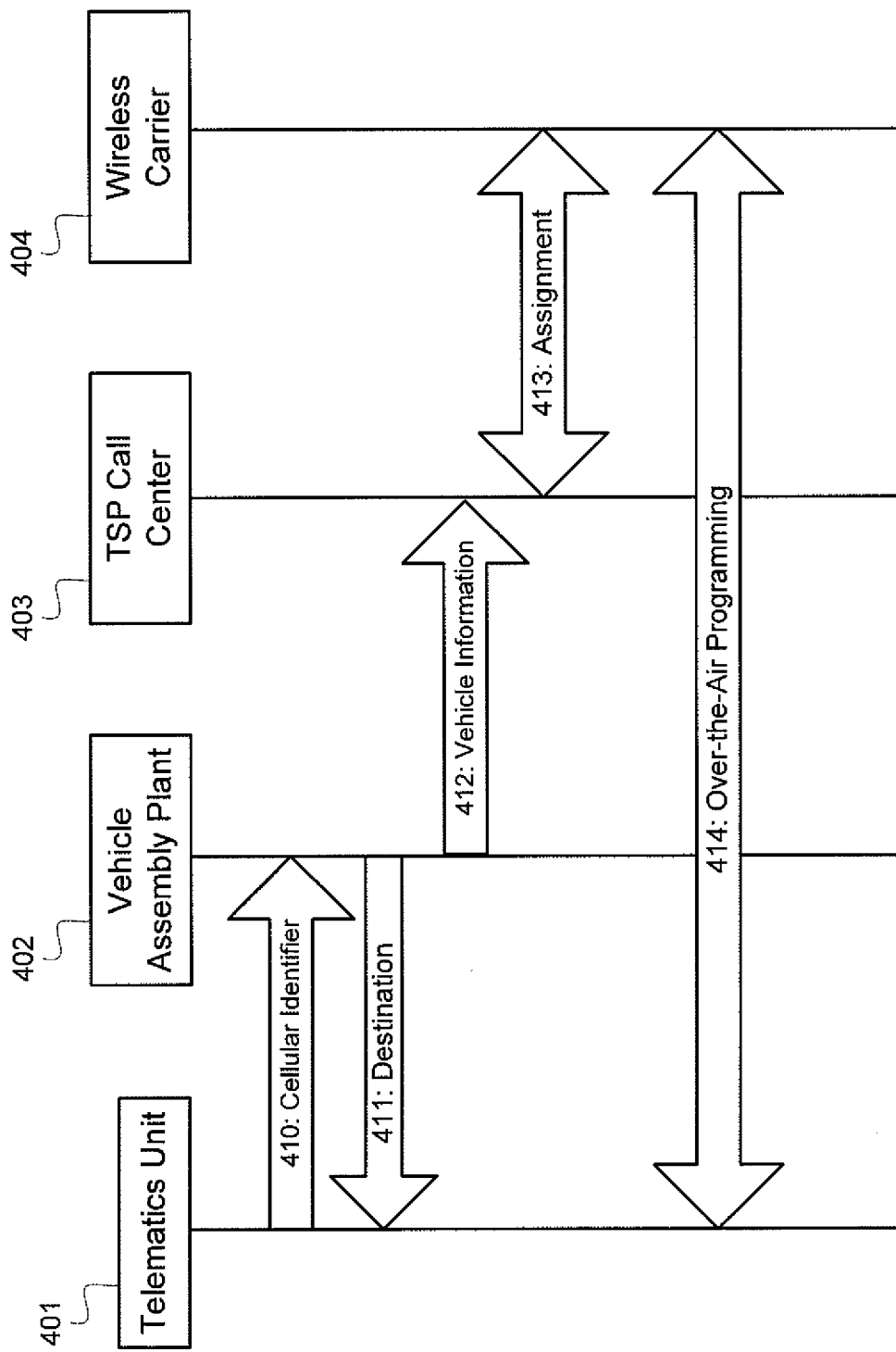
FIG. 4 is a flowchart illustrating data exchanged and the communications between a telematics unit, a vehicle assembly plant, a TSP call center, and a wireless carrier in accordance with an implementation of the described principles.

With further reference to the architecture of FIG. 1 and the process of FIG. 2, and turning more specifically now to FIG. 4, a flowchart 400 is depicted illustrating the exchange of data or information between various components and entities during the vehicle assembly and provisioning processes in one implementation. During the vehicle assembly process, a vehicle assembly plant 402 may receive or extract a cellular identifier 410 (such as, for example, an MEID, IMEI, or ESI) from a telematics unit 401. The vehicle assembly plant 402 may further program a destination 411 into the telematics unit 401 via an assembly plant programming system. The destination may be an area or country, and may be defined as a set of GPS coordinates as described above. The vehicle assembly plant 402 may further send vehicle-related information 412 to a TSP call center 403. The assembly plant 402 may communicate with the TSP call center's 403 back office, and the vehicle-related information 412 may include information such as a VIN, destination information, and a cellular identifier corresponding to the telematics unit equipped to the vehicle.

The TSP call center 403 may further send vehicle information to a wireless carrier 404 so that a phone number or other cellular service information 413 may be assigned to the telematics unit. The TSP call center 403 and wireless carrier 404 may further communicate with each other 413 regarding the assignment of cellular service information to a telematics unit on a telematics-equipped vehicle, and both the TSP call center 403 and wireless carrier 404 may maintain records regarding the results of the assignment. After the telematics-equipped vehicle has arrived at its destination, the telematics unit 401 may communicate 414 with the wireless carrier 404 to conduct over-the-air provisioning of the telematics unit 401 with cellular service information such as a phone number, MIN, MDN or other cellular service information. Interaction 414 between the telematics unit 401 and the wireless carrier 404 may be initiated by a request for an over-the-air programming session sent by the telematics unit 401 to the wireless carrier 404 over the wireless carrier's network. After the over-the-air programming session is complete, the telematics unit 401 may load the cellular service information received into its memory.

It will be appreciated by those of skill in the art that the execution of the various machine-implemented processes and steps described herein may occur via the computerized execution of computer-executable instructions stored on a tangible computer-readable medium, e.g., RAM, ROM, PROM, volatile, nonvolatile, or other electronic memory mechanism. Thus, for example, the operations performed by the telematics unit may be carried out according to stored instructions or applications installed on the telematics unit.

It will be appreciated that the described system and method allows for provisioning of a telematics unit on a telematics-equipped vehicle with cellular service information without pre-loading the cellular service information during manufacture of the vehicle or telematics unit. It will also be appreciated, however, that the foregoing methods and implementations are merely examples of the inventive principles, and that these illustrate only preferred techniques.

It is thus contemplated that other implementations of the invention may differ in detail from foregoing examples. As such, all references to the invention are intended to reference the particular example of the invention being discussed at that point in the description and are not intended to imply any limitation as to the scope of the invention more generally. All language of distinction and disparagement with respect to certain features is intended to indicate a lack of preference for those features, but not to exclude such from the scope of the invention entirely unless otherwise indicated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for provisioning a telematics unit on a telematics-equipped vehicle with cellular service information, the method comprising:
   receiving, by the telematics unit, a set of Global Positioning System (GPS) coordinates specifying a destination area during assembly of the telematics-equipped vehicle;
   determining, by the telematics unit, after assembly of the telematics-equipped vehicle is completed, whether a current location of the telematics-equipped vehicle is within the destination area; and
   establishing, in response to determining that the telematics-equipped vehicle is within the destination area, an over-the-air programming session through which the telematics unit is configured with cellular service information received from a wireless carrier by communicating via the telematics unit with the wireless carrier via a network.

2. The method according to claim 1, wherein the network is a cellular network associated with the wireless carrier.

3. The method according to claim 1, wherein the cellular service information comprises at least one of a phone number, a MIN (Mobile Identification Number), and a MDN (Mobile Directory Number).

4. The method according to claim 1, wherein a unique cellular identifier is associated with the telematics unit.

5. The method according to claim 4, wherein the unique cellular identifier comprises at least one of a IMEI (International Mobile Equipment Identity), MEID (Mobile Equipment identifier), and ESN (Electronic Serial Number).

6. A non-transient computer readable medium, within a telematics unit associated a telematics-equipped vehicle, having thereon computer executable instructions for provisioning the telematics unit with cellular service information, the telematics unit having wireless communication hardware and GPS (Global Positioning System) hardware, the computer executable instructions comprising instructions for:
   receiving a set of GPS coordinates specifying a destination area during assembly of the telematics-equipped vehicle;
   determining, after assembly of the telematics-equipped vehicle is completed, whether a current location of the telematics-equipped vehicle is within the destination area; and
   establishing, in response to determining that the telematics-equipped vehicle is within the destination area, an over-the-air programming session through which the telematics unit is configured with cellular service information received from a wireless carrier by communicating via the telematics unit with the wireless carrier via a network.

7. The non-transient computer readable medium according to claim 6, wherein the cellular service information comprises at least one of a phone number, a MIN (Mobile identification Number), and a MDN (Mobile Directory Number).

8. The non-transient computer readable medium according to claim 6, wherein the network is a cellular network associated with the wireless carrier.

9. A method for provisioning a telematics-equipped vehicle with cellular service information without pre-loading the cellular service information into the telematics unit during vehicle assembly, the method comprising:
- equipping a telematics unit to a vehicle during assembly of the telematics-equipped vehicle;
- programming a set of Global Positioning System (UPS) coordinates specifying a destination area into the telematics unit;
- determining a unique cellular identifier associated with the telematics unit;
- completing assembly of the telematics-equipped vehicle, wherein the telematics unit is not loaded with cellular service information upon completion of the assembly of the telematics-equipped vehicle;
- sending vehicle information of the telematics-equipped vehicle including the unique cellular identifier to a telematics service provider (TSP), wherein the TSP communicates with a wireless carrier to assign cellular service information to the telematics unit; and
- shipping the assembled telematics-equipped vehicle to the destination area, wherein the telematics unit is configured with the cellular service information assigned to the telematics unit while the assembled telematics-equipped vehicle is within the destination area through an over-the-air programming session with the wireless carrier over a network.

10. The method of claim 9, wherein the cellular service information comprises at least one of a phone number, a MIN (Mobile Identification Number), and a MDN (Mobile Directory Number).

* * * * *